United States Patent Office 3,068,458
Patented Dec. 11, 1962

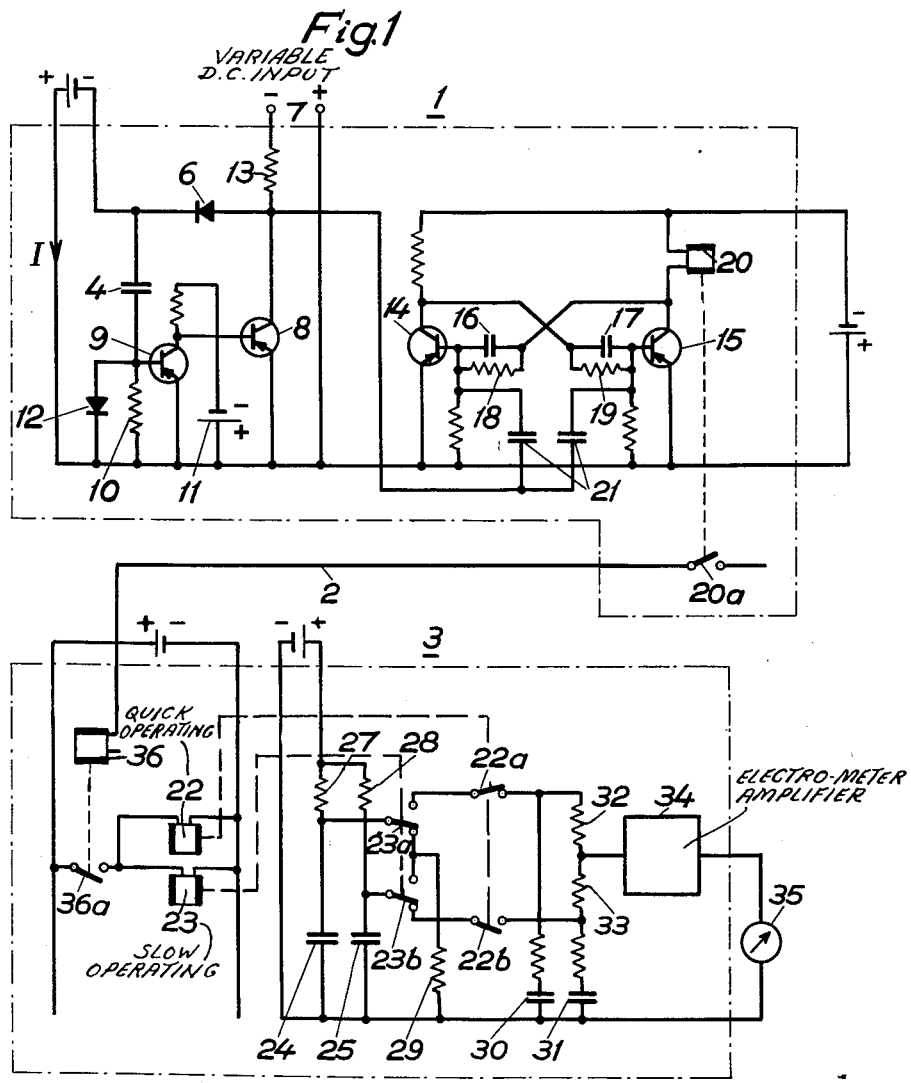

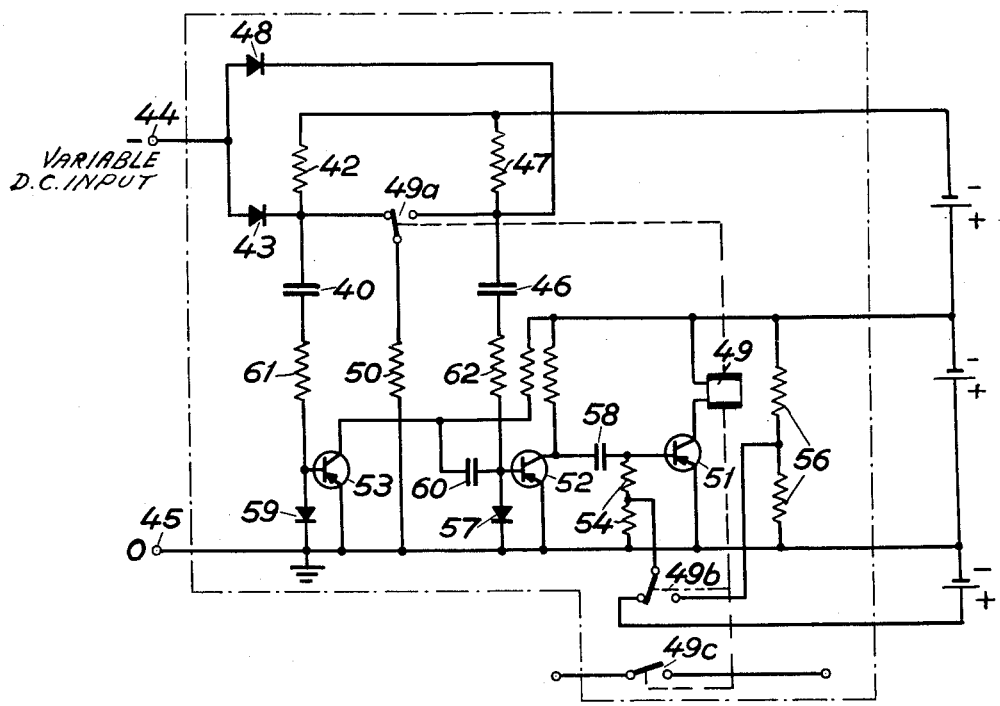

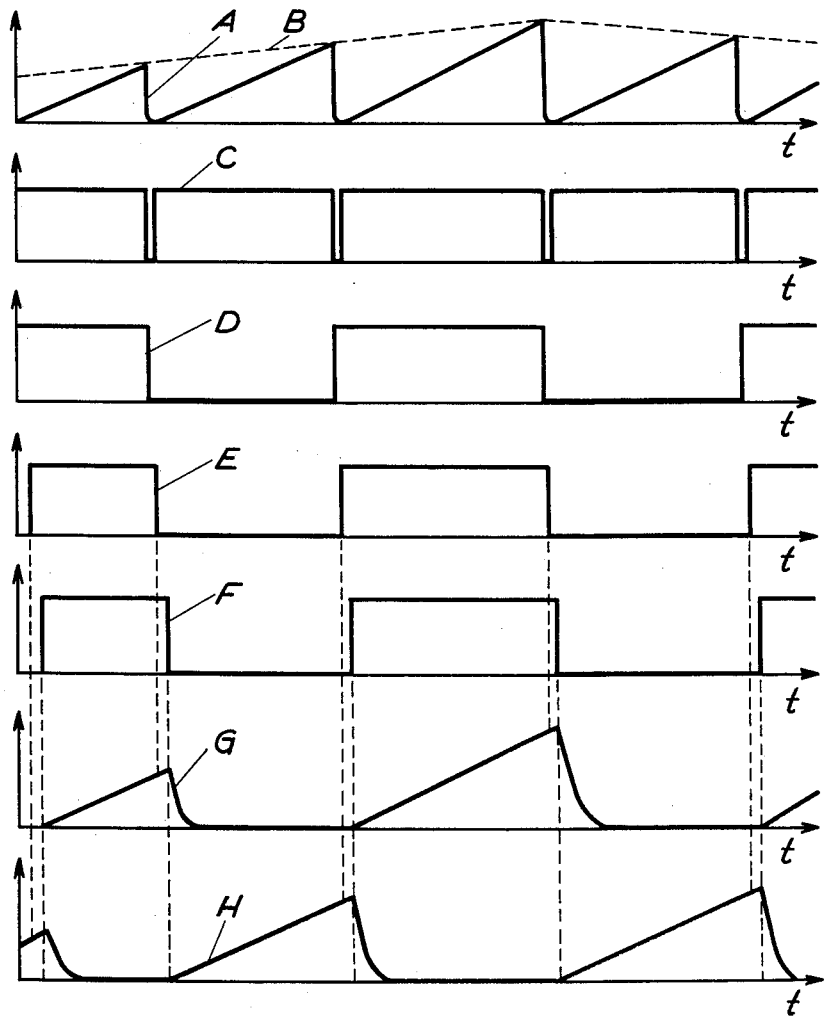

3,068,458
REMOTE METERING BY MEANS OF IMPULSE SERIES
Hugo Hansson, Carl Petterson, and Egil Angeid, Vasteras, Sweden, assignors to Allmanna Svenska Elektriska Aktiebolaget, Vasteras, Sweden, a corporation of Sweden
Filed Oct. 17, 1957, Ser. No. 690,720
Claims priority, application Sweden Oct. 19, 1956
3 Claims. (Cl. 340—206)

The present invention relates to a method for transmitting a metering quantity by means of an impulse series representing the metering quantity.

Previously, when using an impulse series in remote metering, the metering quantity was usually transformed by means of an impulse transmitter, into an impulse series with an impulse frequency proportional to the metering quantity. At the receiving station the impulse frequency is measured, fundamentally by counting the number of impulses received during a fixed time. This is generally performed by charging a capacitor once for each received impulse and by measuring the average of the charging current. Irrespective of the construction of the receiver however, the response time, i.e. the time interval between a sudden alteration in the metering quantity and the moment the value of the alteration can be observed at the receiving station with sufficient accuracy, will be rather long, as a certain number of impulses must always be received before the value of the impulse frequency can be determined. It is generally reckoned with a response time corresponding to about ten impulse periods. The long response time causes that variations of short duration in the metering quantity will not be observed at the receiver and that very great difficulties will arise if the remote metering is a part of a regulating system. In order to save transmission channels between the transmitting and receiving station, a method that is frequently used is to send several different metering quantities cyclically, one after the other on the same transmission channel. When using the impulse frequency method for cyclical metering it is necessary for the above mentioned reasons that each metering quantity is connected to the transmission channel for rather a long time, at least ten impulse periods, which causes the time interval between two consecutive transmissions of the same metering quantity, which time determines in this case the response time of the metering, to become very long. In order to synchronize the change-over between the different metering quantities at the transmitter station with the corresponding change-over between the different measuring instruments at the receiver station, it is further necessary to transmit special synchronizing pulses, which takes a certain time so that the speed of the metering is further decreased. The only possibility of making a remote metering by the impulse frequency method, quicker, is to increase the impulse frequency used, which however, would increase the requirements on the transmission channel and on the operation speed and endurance of the components, for instance the relays, in the transmitter and the receiver.

In another known, but less used method for remote metering by means of impulse series, the duration of the impulses of the impulse series is made proportional to the metering quantity whereas the impulse frequency is kept constant. Fundamentally this method ensures a much faster metering than the impulse frequency method as at the receiver station an accurate value of the metering quantity is obtained as soon as the duration time of one single impulse is measured. The length of an impulse can however, be highly changed, because of the distortion on the transmission channel and in the transmitter and the receiver, which causes a corresponding distortion of the metering quantity. In order to reduce the disadvantageous influence of the distortion on the accuracy of measurement, the duration time of the impulses is generally chosen to be rather long, some seconds, so that the comparatively small changes in the length of the impulses, caused by the distortion, do not give too great a measuring error. However, the long impulse duration causes, of course, the metering to become little faster than by the impulse frequency method.

The object of the present invention is a new method of remote metering by means of an impulse series, which method makes the metering very fast and highly independent of distortion and is very suitable for cyclically metering several different metering quantities on the same transmission channel.

Another object of the invention is an impulse transmitter suitable for performing the new method.

A further object is an impulse receiver suitable for performing the new method.

The method according to the invention is mainly that the metering quantity, by means of an impulse transmitter, is transformed into an impulse series having a duration of the impulse periods proportional to the metering quantity, and that said impulse series is transmitted to an impulse receiver by means of which, for each impulse period a quantity proportional to the duration of the period is produced and stored until a corresponding quantity proportional to the duration of the immediately following impulse period is produced.

As a result, the invention makes the response time equal to the duration time of the period at the most, because of which the metering becomes about ten times faster than by the impulse frequency method at the same impulse frequency. Instead of making use of this greater speed, impulse periods of longer duration, that is a lower impulse frequency, can be used, whereby considerably less wear on the relays and other components is obtained.

The metering according to the invention becomes highly independent of the distortion on the transmission channels and also of the difference between the pick up time and the drop out time of the relays, as an extension or shortening of the impulses involves the corresponding shortening or extension, respectively, of the intervals so that the duration of the periods remains unchanged and consequently accurately represents the metering quantity. The distortion of the transmission channels and in the relays will only influence the metering quantity if the distortion varies very rapidly during a single period.

The invention has also the advantage that without difficulty it can be used for cyclically metering several metering quantities on the same transmission channels. Because of the short response time it is only necessary to transmit one impulse period at a time from each metering quantity and the metering impulses themselves can be used to control selectors in the transmitting station and the receiving station which successively connect the different metering quantities to the impulse transmitter and the different measuring instruments to the impulse receiver.

According to one form of the invention the impulse receiver is adapted to produce, for each impulse, a quantity proportional to the duration of the impulse and, for each interval, another quantity proportional to the duration of the interval, and to store these quantities, proportional to the duration of the impulses and the intervals, respectively, in such a way that all the time a quantity is available, which is proportional to the sum of the duration of the preceding impulse and the duration of the preceding interval. This method results in a further increase of the speed of the metering, as at least one half of an alteration in the metering quantity will be observable at the receiver already after one half of a period at the most. In practice the method also results in a reduced dependence of the pick-up and drop-out times of the relays, due to the fact that by measurement of the length of a complete period without any splitting of the period length into impulse and interval length, namely, a relay or a similar device is required in the receiver, which is in on-position during every second period and in off-position during the other periods so that the difference between the pick-up and drop-out times of these devices will influence the metering quantity. By splitting the period length into impulse length and interval length, all relays and similar devices in the receiver will, however, operate with the true frequency of the impulse series, because of which they perform the same switching movements at the beginning as well as at the end of an impulse period, so that any possible difference between the pick-up and drop-out times does not influence the metering quantity.

In the following the remote metering method according to the invention and transmitter and receiver for the performance of the method will be described in conjunction with the accompanying drawing in which FIG. 1 shows one form of the impulse transmitter and impulse receiver for the remote metering according to the invention. FIG. 2 schematically shows the form of the voltage in some points in the transmitter and receiver in FIG. 1 and the operation of some of the relays. FIG. 3 shows a different form of an impulse transmitter for performing the method according to the invention.

In FIG. 1, the transmitter, designated by 1, is connected through a transmission channel 2 to the receiver 3. The transmitter 1 consists of a capacitor 4 which is connected to a direct current source by 5. The capacitor 4 is connected in parallel with a unidirectional element 6, for instance a silicon diode, in series with a direct current voltage, connected at 7, which is proportional to the metering quantity. A transistor 8 is connected in parallel across the capacitor 4 and the unidirectional element 6. The base of the transistor 8 is connected to the collector of another transistor 9, the base circuit of which is connected across the resistor 10 in series with the capacitor 4. The circuit operates in the following way: The capacitor is charged by the constant direct current I, from the direct current source at 5, because of which the voltage across the capacitor rises at substantially constant rate. Thereby a voltage drop arises across the resistor 10 so that the base of the transistor 9 gets a negative potential and the transistor 9 becomes conducting, which causes the voltage between the base and the emitter of the transistor 8 to become zero, so that this transistor 8 is non-conducting. When the voltage across the capacitor 4 reaches the same value as the voltage proportional to the metering quantity, the uni-directional element 6 starts to conduct, at which the current I flows through the source of the voltage proportional to the metering quantity and the uni-directional element 6 instead of the capacitor 4. Consequently the voltage drop across the resistor 10 vanishes, at which the transistor 9 is cut down and the base of the transistor 8 gets a negative potential from the battery 11 so that the transistor 8 becomes conducting and short-circuits the capacitor 4. The capacitor consequently starts to discharge itself through the transistor 8 at which, because of the voltage drop across the resistor 10, a positive potential arises on the base of the transistor 9, which causes a further closing of the transistor 9 and the corresponding opening of the transistor 8. The positive base potential of the transistor 9 is limited to a permitted value by the uni-directional element 12. When the capacitor 4 is entirely discharged, the voltage drop across the resistor 10 vanishes once more, at which the transistor 9 is opened somewhat and the transistor 8 is consequently closed somewhat. This causes a part of the current I to start to charge the capacitor 4 again, at which a negative potential arises on the base of the transistor 9, so that the transistor 9 is further opened and the transistor 8 further closed, which causes a rapid cumulative process to arise which terminates with the transistor 8 being entirely cut off and a new charging cycle of the capacitor 4 started. The large resistor 13 in series with the voltage proportional to the metering quantity prevents the transistor 8 from being overloaded during the short interval when it is conductant. In FIG. 2 the curve A shows schematically how the voltage across the capacitor 4 varies with the time, and with the voltage proportional to the metering quantity which is represented by the curve B. The curve C shows the voltage across the transistor 8. The time between two consecutive short-circuits of the voltage across the transistor 8 is evidently proportional to the value of the metering quantity. The very short pulses in the voltage across the transistor 8 operate through two coupling capacitors 21, a common multi-vibrator circuit consisting of two transistors 13 and 14, the collectors and bases of which are inter-connected through the capacitors 16 and 17 and the resistors 18 and 19 so that always one of the two transistors is conducting, while the other one is entirely closed, and that an alternation of conducting and non-conducting transistors is performed each time a voltage pulse is applied on the bases, that is each time the transistor 8 becomes conducting. A transmitting relay 20 is connected in the collector circuit of the transistor 15 so that its contact 20a transmits an impulse series on the transmission channels 2 of the form shown by curve D in FIG. 2.

In the receiver 3 the impulse series influences a receiving relay 36, the contact 36a of which operates auxiliary relays 22 and 23. The curve E in FIG. 2 shows the operation of the relay 22 and curve F the operation of the relay 23, from which it seems that the relay 22 is somewhat faster than the relay 23 when picking up as well as dropping out. The receiver consists of two capacitors 24 and 25 which are connected to a direct current source at 26 in series with a large resistor 27 and 28 each. Due to the operation of the relays according to FIG. 2, the capacitor 25 is charged during the intervals simultaneously as the capacitor 24 is short-circuited by the contact 23a of the relay 23 and the short circuiting resistor 29. During the impulses when both relays 22 and 23 are closed, the capacitor 24 is charged, whereas the capacitor 24 is short-circuited by the contact 23b and the resistor 29. If the charging is performed with constant current, the voltages across the capacitors become proportional to the duration of the impulses and the intervals, respectively.

At the end of an impulse the voltage across the capacitor 24 is transferred to the storage capacitor 30 by means of the relay 22 which drops-out so that its contact 22a closes while the relay 23 is still in its on-position. After that the relay 23 also drops-out at which the capacitor 24 is short-circuited by the contact 23a and the short circuit of the capacitor 25 is interrupted so that the capacitor 25 is charged during the following interval. At the end of the interval the voltage across the capacitor 25 is transferred to the storage capacitor 31 by means of the relay 22 which picks-up again so that its contact 22b closes before the relay 23 is closed. After that the relay 23 also picks-up and its contact 23b short-circuits the capacitor 25, whereas its contact 23a interrupts the short circuit of the capacitor 24 which is charged during the following impulse. The storage capacitors 30 and 31 are much smaller than the capacitors 24 and 25, because of which the transfer of the voltage can be performed without any noticeable change in the voltage. The curve G in FIG. 2 shows the voltage across the capacitor 24, whereas the curve H shows the voltage across the capacitor 25. The capacitors 30 and 31 are in parallel with one another and in series with a large resistor 32 and 33 each connected to the input of an electrometer amplifier 34 with a very high input impedance. Across the input of the electrometer amplifier a potential is consequently obtained which equals the average value of the voltages across the capacitors 30 and 31, that is the potential is proportional to the sum of the duration of the preceding impulse and the preceding interval and consequently to the metering quantity, which can be measured by an instrument 35 connected to the output of the electrometer amplifier. Because of the high input impedance of the amplifier the storage capacitors 30 and 31 maintain their voltage for a long time and the amplifier and the capacitor operate together as an electrostatic storage device. The large resistors 32 and 33 prevent the voltage across the storage capacitors 30 and 31 from being equalized during the charging of the charge capacitors 24 and 25.

Due to the properties of the storage device it is achieved that even long interruptions in the transmission channel, that occur during an interval, do not cause any alteration in the output quantity of the electrometer amplifier before a comparatively long time has passed. An interruption occurring during an impulse can, at the most, cause the output quantity of the electrometer amplifier to drop to one half of the true value of the metering quantity.

As the relays 22 and 23 have delayed operation, short disturbances on the transmission channel will not influence the metering as long as they do not occur during the very change between interval and impulse.

It has been supposed in the above that the capacitors in the transmitter and receiver are charged by a constant direct current in order to obtain a perfect linearity, in the transmitter between the metering quantity and the duration of the impulse periods, and in the receiver between the duration of the periods and the output quantity of the electrometer amplifier. If, however, the charging circuits in the transmitter and the receiver are so dimensioned that they have substantially the same time constant, the charging can be performed through resistances from comparatively low constant direct current voltages, in which case the non-linearity caused by the curved charging characteristic becomes equal in the transmitter and the receiver so that the output quantity from the electrometer amplifier becomes directly proportional to the voltage in the transmitter proportional to the metering quantity.

The impulse transmitter in FIG. 3 operates fundamentally in the same way as the transmitter shown in FIG. 1. It is, however, distinguished from this in that it comprises two identical capacitor charging circuits, which operate alternately in such a way that one of them is charged during the impulses of the produced impulse series and is discharged during the intervals, whereas the other is charged during the intervals and discharged during the impulses. Therefore the discharging time for the capacitors will not be included in the duration of the period of the produced impulse series, because of which the duration of the period will be proportional to the metering quantity with greater accuracy. Consequently the time available for the discharge of the capacitors will also be considerably longer, because of which the discharge becomes more complete, which further improves the accuracy of the transmitter. The transmitter in FIG. 3 does not further comprise any multi-vibrator, because of which it is less sensitive to disturbances than the transmitter according to FIG. 1. A further advantage of the transmitter according to FIG. 3 is that it does not load the source for the voltage proportional to the metering quantity.

One of the charging circuits of the transmitter consists of a capacitor 440, which is charged from the constant direct current voltage, connected to the terminal 41, in series with a large resistor 42 so that the charging current becomes substantially constant. The voltage across the capacitor 40 is compared, by means of a uni-directional element 43, with a direct current voltage proportional to the metering quantity, connected between the terminals 44 and 45. The other charging circuit is identically constructed and consists of a capacitor 46, which is charged from the direct current voltage at 41 through the large series resistor 47, and the voltage across it is controlled by means of the uni-directional element 48. The capacitors 40 and 46 are alternately short-circuited by a two-way contact 49a of a relay 49 and a short-circuiting resistor 50. The exciting current for the relay 49 is controlled by a transistor 51, which is connected in series with the relay winding 49 and is controlled by two as phase diverters and amplifiers operating auxiliary transistors 52 and 53, which are controlled by the currents through the capacitors 40 and 46. The relay 49 is provided with a two-way contact 49b which, through the voltage divider 54, supplies the transistor 51 with either a positive base potential from the terminal 55 or a negative base potential from the voltage divider 56. The relay 49 is also provided with an impulse transmitting contact 49b. If the transmitter is in the position shown in FIG. 3 and is connected to the voltages shown, the following will occur. The two-way contact 49b connects the positive potential from the terminal 55 through the voltage divider 54 to the base of the transistor 51, which causes the transistor 51 to be kept fully cut off and the relay 49 to be kept in its off-position. The capacitor 46 is consequently charged, at which the charging current, because of the uni-directional element 57 flows through the base of the transistor 52. Because of this the transistor 52 becomes conducting so that its collector has substantially earth potential, which potential however, from the point of view of the direct current is isolated from the base potential of the transistor 51 by means of the coupling capacitor 58. The capacitor 40, however, is short circuited by the contact 49a and a short circuiting resistor 50, so that no current flows through it because of which the base of the transistor 53 has earth potential and the transistor 53 is cut off. The collector of the transistor 53 has consequently a large negative potential which, however, from the point of view of the direct current is isolated from the base potential of the transistor 52 by means of the coupling capacitor 60. As the uni-directional element 43 is situated between the short-circuit of the capacitor 40 and the source of the direct current voltage proportional to the metering quantity connected at 44, this source will never be loaded by the short-circuiting of the capacitors. When the voltage across the capacitor 46 reaches the same value as the voltage between the terminals 44 and 45, which is proportional to the metering quantity, the uni-directional element 48 starts to conduct and the charging current through the capacitor 46 vanishes. At this the negative control potential of the base of the transistor 52 disappears, because of which the transistor 52 is cut down and an immediate drop in its collector potential is obtained. As the voltage across the capacitor 58 cannot be momentarily altered a negative voltage pulse is obtained at the same time on the base of the transistor 51 which makes the transistor 51 conductive, so that the relay 49 picks up. When the two-way contact 49a leaves its off-position, the base potential of the transistor 51 becomes further negative as the positive potential from the terminal 55 disappears. The capacitor 58 is so dimensioned that the negative voltage pulse on the base of the transistor 51 lasts until the relay 49 has picked up and its contact 49b has reached its on-position, at which the base of the transistor 51 receives a permanent negative control voltage from the voltage divider 56, so that the transistor 51 is kept fully open and the relay 49 is kept in its on-position. When the contact 49a leaves its off-position the charging of the capacitor 40 is started, at which the charging current, because of the uni-directional element 59, flows through the base of the transistor 53, so that this transistor 53 becomes conducting and a large increase is obtained in its collector potential. Because of the coupling capacitor 60 a positive voltage pulse is obtained at the same time on the base of the transistor 52, which co-operates in cutting-off the transistor 52. When the contact 49a reaches its on-position the capacitor 46 is short-circuited and the discharging current which passes through the uni-directional element 57 causes a positive potential on the base of the transistor 52 also, so that this transistor 52 is cut-off. A negative control voltage is therefore ensured to the base of the transistor 51 so that this transistor 51 will certainly become fully conductant. Everything consequently co-operates in forcing the relay 49 to pick up and as a result to shift the charging circuit. When the voltage across the capacitor 40 reaches the voltage proportional to the metering quantity, the uni-directional element 43 becomes conducting and the charging current through the capacitor 40 ceases. At this the negative control voltage on the base of the transistor 53 also vanishes, and the transistor 53 is cut down. This potential drop causes a negative voltage pulse through the capacitor 60 on the base of the transistor 52, so that this transistor 52 becomes conductant, which in its turn gives a positive voltage impulse on the base of the transistor 51 so that this transistor 51 is cut off and the relay 49 drops out.

When the contact 49b leaves its on-position the base potential of the transistor 51 becomes further positive, due to the face that the negative potential from the voltage divider 56 disappears. As the capacitor 58 is so dimensioned that the positive voltage pulse on the base of the transistor 51 lasts during the operating time of the relay 49, this relay 49 will certainly drop out, and when the contact 49 reaches its off-position it connects from the terminal 55 a permanent positive potential to the base of the transistor 51, which keeps the transistor 51 cut off and the relay 49 in its off-position. When the contact 49a returns to its off-position a new charging of the capacitor 46 is started and the capacitor 40 is discharged. By means of the auxiliary transistors 52 and 53 this causes also positive voltage pulses on the base of the transistors 51 and consequently helps to make the relay 49 drop off. Resistances 61 and 62 are connected in series with the capacitors 40 and 46. These resistances 61 and 62 are so dimensioned that the voltage drops arising across them during the charging of the capacitors are substantially equal to the threshold voltages of the uni-directional elements 43 and 48. This has a result that the capacitors 40 and 46 will always be charged to a voltage which is exactly equal to the voltage proportional to the metering quantity, which improves the accuracy of the transmitter. To bring the relay 49 to pick up or drop out a voltage pulse is necessary on the base of the transistor 51, which is at least as long as the operating time of the relay 49, because of which short disturbances do not influence the transmitter.

The invention is, of course, not limited to the embodiments described above. The receiver can for instance be made up with only one charging circuit and one capacitor, which is charged and afterwards rapidly discharged after which a new charging cycle is immediately started. The capacitors of the receiver can further, as already mentioned, be so arranged that they are charged during the duration of a whole period, so that no splitting into impulse time and interval time is achieved, in which case only one storage capacitor is necessary across the input of the electrometer amplifier. When two storage capacitors are connected to the input of the electrometer amplifier they can be connected in series instead of in parallel.

We claim as our invention:

1. A remote metering system comprising means for generating an impulse series consisting of alternately consecutive impulses and intervals, an impulse and an adjacent interval constituting a period, the duration of each complete period during being proportional to a quantity to be remotely metered, said generating means comprising a charging circuit comprising a capacitor, a substantially constant direct current source, a first diode and a resistor, means connecting the first diode and the resistor in parallel, means connecting said capacitor to said direct current source and to said first diode and resistor, a second diode, a second source of direct current voltage proportional to said quantity to be remotely metered, means connecting said second diode to said second source of voltage to render said second diode conductive when the voltage of said capacitor exceeds the voltage of said second direct current source, means responsive to variations in the current through said capacitor for short-circuiting said capacitor, a receiving means, means responsive to short-circuiting of the capacitor for sending impulses to said receiving means, said receiving means comprising means for producing quantities proportional to the duration of the periods in said impulse series, means connected to said last mentioned means for storing said quantities produced for at least the length of a period, and means connected to said storing means for measuring the quantity last stored therein.

2. A remote metering system as claimed in claim 1, said means for short-circuiting said capacitor comprising a transistor connected across said capacitor and responsive to the variations in the current through said capacitor.

3. A remote metering system as claimed in claim 2, said sending means comprising a multi-vibrator circuit triggered by the voltage across said transistor and an impulse transmitting relay connected to and controlled by said multi-vibrator circuit.

References Cited in the file of this patent

UNITED STATES PATENTS

| | | |
|---|---|---|
| 2,336,929 | Doyle | Dec. 14, 1943 |
| 2,426,204 | Greig | Aug. 26, 1947 |
| 2,522,110 | Forster | Sept. 12, 1950 |
| 2,605,345 | Cohen | July 29, 1952 |
| 2,645,755 | Garfield | July 14, 1953 |
| 2,712,128 | Woodruff | June 28, 1955 |
| 2,713,135 | Macklen | July 12, 1955 |
| 2,731,626 | Carolus | Jan. 17, 1956 |
| 2,740,109 | Okrent | Mar. 27, 1956 |
| 2,858,438 | Merrill | Oct. 28, 1958 |
| 2,883,650 | Brockway | Apr. 21, 1959 |